(12) United States Patent
Dufour et al.

(10) Patent No.: US 11,494,374 B2
(45) Date of Patent: Nov. 8, 2022

(54) PROCESSING DATABASE REQUESTS

(71) Applicant: AMADEUS S.A.S., Biot (FR)

(72) Inventors: David Dufour, Biot (FR); Loic Cretin, Biot (FR); Jerome Folli, Biot (FR)

(73) Assignee: AMADEUS S.A.S., SOPHIA ANTIPOLIS, Biot (FR)

( * ) Notice: Subject to any disclaimer, the term of this patent is extended or adjusted under 35 U.S.C. 154(b) by 23 days.

(21) Appl. No.: 16/511,047

(22) Filed: Jul. 15, 2019

(65) Prior Publication Data

US 2021/0019308 A1 Jan. 21, 2021

(51) Int. Cl.
| | | |
|---|---|---|
| *G06F 16/245* | (2019.01) | |
| *G06F 16/22* | (2019.01) | |
| *G06F 16/27* | (2019.01) | |
| *G06Q 30/06* | (2012.01) | |

(52) U.S. Cl.
CPC ............ *G06F 16/245* (2019.01); *G06F 16/22* (2019.01); *G06F 16/27* (2019.01); *G06Q 30/0625* (2013.01)

(58) Field of Classification Search
CPC ........ G06F 16/245; G06F 16/27; G06F 16/22; G06F 16/1827; G06F 3/067; G06F 16/182; G06F 16/1824; G06F 16/185; G06F 16/25; G06F 16/252; G06F 16/254; G06F 16/256; G06F 16/258; G06F 16/172; G06F 16/24539; G06F 16/24552; G06F 16/957; G06F 16/9574; G06Q 30/0625; H04L 67/2857; H04L 67/2842; H04L 67/1097
See application file for complete search history.

(56) References Cited

U.S. PATENT DOCUMENTS

| | | | |
|---|---|---|---|
| 7,013,289 B2 | 3/2006 | Horn et al. | |
| 8,805,950 B1* | 8/2014 | Landsman | .......... H04L 67/2847 |
| | | | 709/213 |
| 9,292,620 B1* | 3/2016 | Hoover | ............... G06F 16/2471 |
| 9,904,964 B1* | 2/2018 | O'Neil-Dunne | ... G06Q 30/0635 |
| 2002/0116457 A1* | 8/2002 | Eshleman | .......... H04L 67/2852 |
| | | | 709/203 |
| 2002/0161791 A1* | 10/2002 | Hanhikoski | ........... G06F 16/972 |
| 2003/0204553 A1* | 10/2003 | Neylon | ............... H04L 61/2007 |
| | | | 718/104 |

(Continued)

FOREIGN PATENT DOCUMENTS

WO WO-2018147901 A1 8/2018

*Primary Examiner* — Truong V Vo
(74) *Attorney, Agent, or Firm* — Perry + Currier, Inc.

(57) ABSTRACT

Database requests are processed in a distributed database system comprising a central database subsystem and a plurality of local database subsystems comprising a first local database subsystem. The central database subsystem receives a second database request indicating at least one unique identifier of at least one database result of a plurality of database results which have been stored with corresponding unique identifiers by the first local database subsystem in response to a first database request received at the first local database subsystem. The at least one database result identified by the at least one unique identifier is retrieved from the first local database subsystem, processed and stored persistently in a database of the central database subsystem. At least the first local database subsystem and the central database subsystem may operate according to the New Distribution Capability (NDC) standard.

19 Claims, 8 Drawing Sheets

(56) References Cited

U.S. PATENT DOCUMENTS

| | | | | |
|---|---|---|---|---|
| 2006/0271557 A1* | 11/2006 | Harward | ............. | G06F 9/45504 |
| 2007/0219962 A1* | 9/2007 | Noirot-Nerin | ......... | G06Q 30/02 |
| 2008/0270224 A1* | 10/2008 | Portman | ............ | G06Q 30/0255 |
| | | | | 455/456.3 |
| 2009/0018991 A1 | 1/2009 | Thiyagarajan et al. | | |
| 2009/0037424 A1* | 2/2009 | Susairaj | .............. | H04L 67/1097 |
| 2009/0070337 A1* | 3/2009 | Romem | .................. | G06F 16/27 |
| 2010/0306234 A1* | 12/2010 | Wang | ................ | G06F 16/90335 |
| | | | | 707/769 |
| 2011/0252005 A1* | 10/2011 | Lauer | ................. | G06F 16/2471 |
| | | | | 707/690 |
| 2011/0258243 A1* | 10/2011 | Katte | ................. | H04L 67/2847 |
| | | | | 707/827 |
| 2011/0320400 A1* | 12/2011 | Namini | ................... | G06F 16/21 |
| | | | | 707/610 |
| 2014/0195602 A1* | 7/2014 | Carricarte | ............... | H04L 67/42 |
| | | | | 709/203 |
| 2015/0178807 A1* | 6/2015 | Tiwari | ............... | G06Q 30/0629 |
| | | | | 705/26.62 |
| 2016/0171008 A1* | 6/2016 | Ciabrini | ............ | G06F 16/24552 |
| | | | | 707/609 |
| 2017/0147652 A1* | 5/2017 | Kuo | ........................ | G06F 16/21 |
| 2019/0108229 A1* | 4/2019 | Sista | ................. | G06F 16/24552 |
| 2019/0219999 A1* | 7/2019 | Lam | ....................... | G01C 21/34 |

* cited by examiner

PROCESSING DATABASE REQUESTS

FIELD

The present disclosure relates to database technology. More specifically, it relates to processing database requests and database request results in a distributed database environment.

BACKGROUND

Today's database environments are often of distributed character. For example, data is hosted at a central database, while other data is hosted at dislocated databases. Separation may also be established by dividing a database system into a frontend system and a backend system. An example is U.S. Pat. No. 9,946,752 B2. Another prior art example is U.S. Pat. No. 7,013,289 B2, according to which database requests are received and processed at various nodes of distributed database systems.

SUMMARY

The present disclosure aims at improving network utilization among nodes, entities or subsystems of a distributed database system as well as utilization of memory of the subsystems. More specifically, the present disclosure is concerned with introducing coordinated processing of related database requests which are handled by different subsystems of the distributed database in order to render processing of such database requests more efficiently in terms of memory and network utilization.

According to a first aspect, a method for processing database requests in a distributed database system is provided. The distributed database system comprises a central database subsystem and a plurality of local database subsystems comprising a first local database subsystem. The method comprises, at the central database subsystem, receiving a second database request indicating at least one unique identifier of at least one database result of a plurality of database results which have been stored with corresponding unique identifiers by the first local database subsystem in response to a first database request received at the first local database subsystem; retrieving the at least one database result identified by the at least one unique identifier from the first local database subsystem; processing the at least one retrieved database result and storing the at least one processed database result persistently in a database of the central database subsystem.

In some embodiments, a unique identifier of the unique identifiers comprises a first portion identifying a local database subsystem of the plurality of local database subsystems storing the respective database result and a second portion identifying the respective database result, and wherein retrieving the at least one database result comprises resolving the at least one unique identifier included in the second database request to identify, based on the first portion of the at least one unique identifier, the first local database subsystem as the local database subsystem of the plurality of the local database subsystem that stores the at least one database result, and sending a retrieval request including at least the second portion of the at least one unique identifier to the identified first local database subsystem.

In some embodiments, the at least one unique identifier further comprises a third portion identifying a set of database results which is constituted by the plurality of database results which have been stored by the first local database subsystem, wherein the retrieval request includes the third portion of the at least unique identifier to retrieve the at least one database result identified by the at least one unique identifier from the set of database results.

In some embodiments, the method further comprises, before receiving the second database request, registering, at the central database subsystem, the first local database subsystem, comprising: assigning a local database subsystem identifier identifying the first local database subsystem, wherein the local database subsystem identifier constitutes the first portion of the unique identifiers of the plurality of database results which have been stored by the first local database subsystem; and storing the assigned local database subsystem identifier for retrieving database results from the first local database subsystem.

In some embodiments, the method further comprises deleting, by the first local database subsystem, the plurality of database results which have been stored by the first local database subsystem upon expiry of a given time period after the storing.

In some embodiments, the method further comprises, at the central database subsystem, receiving a third database request indicating at least one of the unique identifiers of the at least one processed database result stored persistently in the database of the central database subsystem; retrieving the at least one database result identified by the at least one unique identifier indicated by the third database request from the database of the central database subsystem; further processing the at least one retrieved database result and storing the at least one further processed database result persistently in the database of the central database subsystem.

In some embodiments, the first local database subsystem is a cloud subsystem.

In some embodiments, at least the first local database subsystem and the central database subsystem operate according to the New Distribution Capability (NDC) standard.

In some embodiments, the first database request is a shopping request, i.e. a request to retrieve travel offers, based on the NDC standard. The second request may be a request to get detailed pricing information on a selected travel offer based on the NDC standard or a request to purchase a selected travel offer based on the NDC standard.

In some embodiments, the third database request is a request to purchase a selected offer based on the NDC standard or a request to change or cancel an existing booking or travel order based on the NDC standard.

According to another aspect, a central database subsystem for processing database requests is provided. The central database subsystem is part of a distributed database system also comprising a plurality of local database subsystems comprising a first local database subsystem. The central database subsystem is arranged to receive a second database request indicating at least one unique identifier of at least one database result of a plurality of database results which have been stored with corresponding unique identifiers by the first local database subsystem in response to a first database request received at the first local database subsystem; retrieve the at least one database result identified by the at least one unique identifier from the first local database subsystem; process the at least one retrieved database result and store the at least one processed database result persistently in a database of the central database subsystem.

In some embodiments, the central database subsystem is further arranged to perform the method of any one of the embodiments set out above.

According to another aspect, a computer program product is provided which comprises program code instructions stored on a computer readable medium to execute the method steps according to any one of the embodiments set out above when said program is executed on a computer.

According to still a further aspect, a method for processing database requests is provided in a distributed database system comprising a central database subsystem and a plurality of local database subsystems comprising a first local database subsystem, and the method comprises: receiving, at the first local database subsystem, a first database request; returning, by the first local database subsystem, a plurality of database results and corresponding unique identifiers for each of the plurality of database results and storing the plurality of database results with the corresponding unique identifiers in a database of the first local database subsystem; receiving, at the central database subsystem, a second database request indicating at least one of the unique identifiers of the plurality of database results; retrieving, by the central database subsystem, the at least one database result identified by the at least one unique identifier from the first local database subsystem; processing, by the central database subsystem, the at least one retrieved database result and storing the at least one processed database result persistently in a database of the central database subsystem.

Further refinements of this further aspect are the method embodiments as set out above.

According to still a further aspect, a distributed database system is provided for processing database requests comprising a central database subsystem and a plurality of local database subsystems comprising a first local database subsystem, the database system being arranged to: receive, at the first local database subsystem, a first database request; return, by the first local database subsystem, a plurality of database results and corresponding unique identifiers for each of the plurality of database results and storing the plurality of database results with the corresponding unique identifiers in a database of the first local database subsystem; receive, at the central database subsystem, a second database request indicating at least one of the unique identifiers of the plurality of database results; retrieve, by the central database subsystem, the at least one database result identified by the at least one unique identifier from the first local database subsystem; process, by the central database subsystem, the at least one retrieved database result and store the at least one processed database result persistently in a database of the central database subsystem.

In some refinement embodiments, the distributed data system is arranged to perform the functions of any one of the embodiments mentioned above.

BRIEF DESCRIPTION OF THE FIGURES

The accompanying drawings illustrate various embodiments of the subject disclosure and, together with the general description given above, and the detailed description of the examples given below, serve to explain the examples of the subject disclosure. In the drawings, like reference numerals are used to indicate like parts in the various views.

DESCRIPTION

The subject disclosure generally pertains to processing search queries in a distributed database system. The term "search request" includes all types of database requests including e.g. read requests to retrieve data and write requests to insert, change or delete data.

Figure 1:
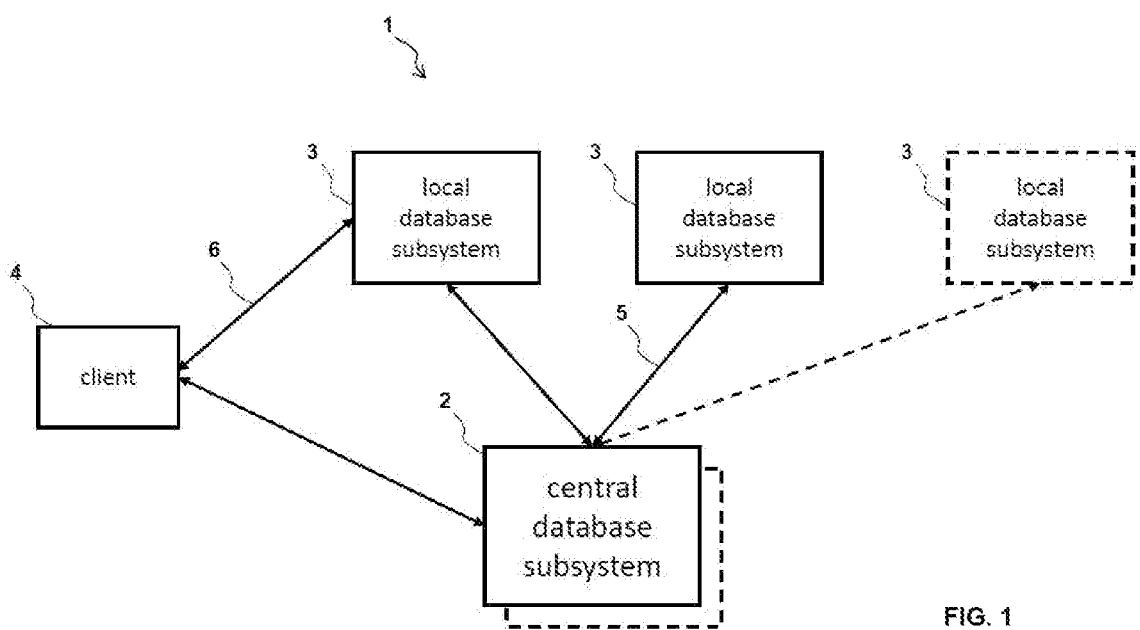
FIG. 1 depicts an exemplary distributed database system with subsystems that interact with client devices.

An example of a distributed database system 1 is given by FIG. 1. The server-side of the database system is formed by a plurality of database nodes, referred to as subsystems herein. The different subsystems generally have different functionalities, i.e. handle different types of database requests. The database system 1 includes multiple local database subsystems 3. It is assumed herein that a local database subsystem 3 processes at least one type of database requests, hereinafter referred to as first database request. Hence, the local database subsystems 3 store or have access to data to process and respond to first database requests.

The database system 1 further includes one or more central database subsystems 2. It is assumed herein that a central database subsystem 2 processes further types of database requests, hereinafter referred to as second database request and third database request. In general, the second and third database requests can be considered to be follow-up requests to first database requests. Hence, a local database subsystem 3 may receive a first database request, process the first database request and return a result. Subsequently, a central database subsystem 2 may receive a second database request which is related to the first database request, process the second database request and return a result. The central database subsystem 2 may then also receive a third database request which is related to the second database request, process the third database request and return a results.

Database requests to the database subsystem 1 are generated and sent by client devices 4. For example, a client device 4 may be personal computers or mobile communication devices such as smartphones, tablets, personal assistance, or the like, equipped with hardware and software to implement the client functionalities of generating the first, second, third database requests, transmit the database requests to the respective database subsystem, as well as receive and process responses from the database subsystems.

The local database subsystems 3 are communicatively connected to the one or more central database subsystems 2 through one or more communication interfaces 5. The communication interfaces 5 may use communication networks such as Local Area Networks (LANs), Metropolitan Area Networks (MAN), or Wide Area Networks (WANs) including the Internet. Similarly, a client device 4 is communicatively connected to at least one of the local database subsystems 3 as well as to at least one central database subsystem 2 though one or more communication interfaces 6 by way of similar communication network technology. In the event of multiple central database subsystems 2, these are communicatively connected with each other as well and may employ a synchronization/replication mechanism to provide for data consistency across the multiple central database subsystems 2.

It should be noted that the terms local database subsystem and central database subsystem are to be understood broadly and refer to the different functions of the database subsystems. In some non-limiting embodiments, the database system 1 includes a smaller number of central database subsystems 2 such as one or two central database subsystems 2 and a higher number of local database subsystems 3. Further, in some non-limiting embodiments, the local database subsystems 3 are distributed geographically so that geographically close first client devices 4 would send their first database requests to a local database subsystem 3A (see FIGS. 4, 5, 6 described in detail below) in the geographical vicinity of this number of client devices 4, whereas other second client devices 4 which are geographically remote from the first client devices 4, would send their first database requests to another second local database subsystem 3B (FIGS. 4, 5, 6) that is geographically closer to the second client devices 4 than the first local database subsystem 3A. The central database system 2, however, may be geographically further remote to these first and second client devices 4 than the local database subsystem 3A and 3B, respectively. This has the technical effect of reduced latencies (compared with a setup where client device 4 sends first database requests to a geographically remote database subsystem).

In some non-limiting embodiments, the local database subsystems 3 may be computation centers which are geographically distributed over multiple locations, such as cities, countries, or continents, and the central database subsystem(s) may be central computation centers, e.g. one per country or per continent.

The local database subsystems 3 and the central database subsystem 2 store data by way of databases. The databases may be co-located to the respective subsystem or located remotely, e.g. as a cloud database. Herein, the term database is meant to encompass any types of structured information storage system such as standard stand-alone databases like SQL or Non-SQL databases as well as complex, distributed and/or proprietary databases, relational databases or object-oriented databases.

The data stored by the distributed database system 1 may concern any type of information in a particular domain. For example, the data may be located in the domain of computer-based electronic circuit simulations and contain information on input values for the computer-based electronic circuit simulations, parameters of a model used by the computer-based electronic circuit simulations, intermediate and/or final simulation results, and the like. This computer-based electronic circuit simulation related data is kept by the local database subsystems 3 and may be queried by a client device 4 on which the computer-based electronic circuit simulation is carried out. Follow-up database requests, e.g. during the simulation run by the client or to process/write-back simulation evaluation data after simulation runs have been concluded, may then be handled by the central database subsystem 2.

Figure 2:
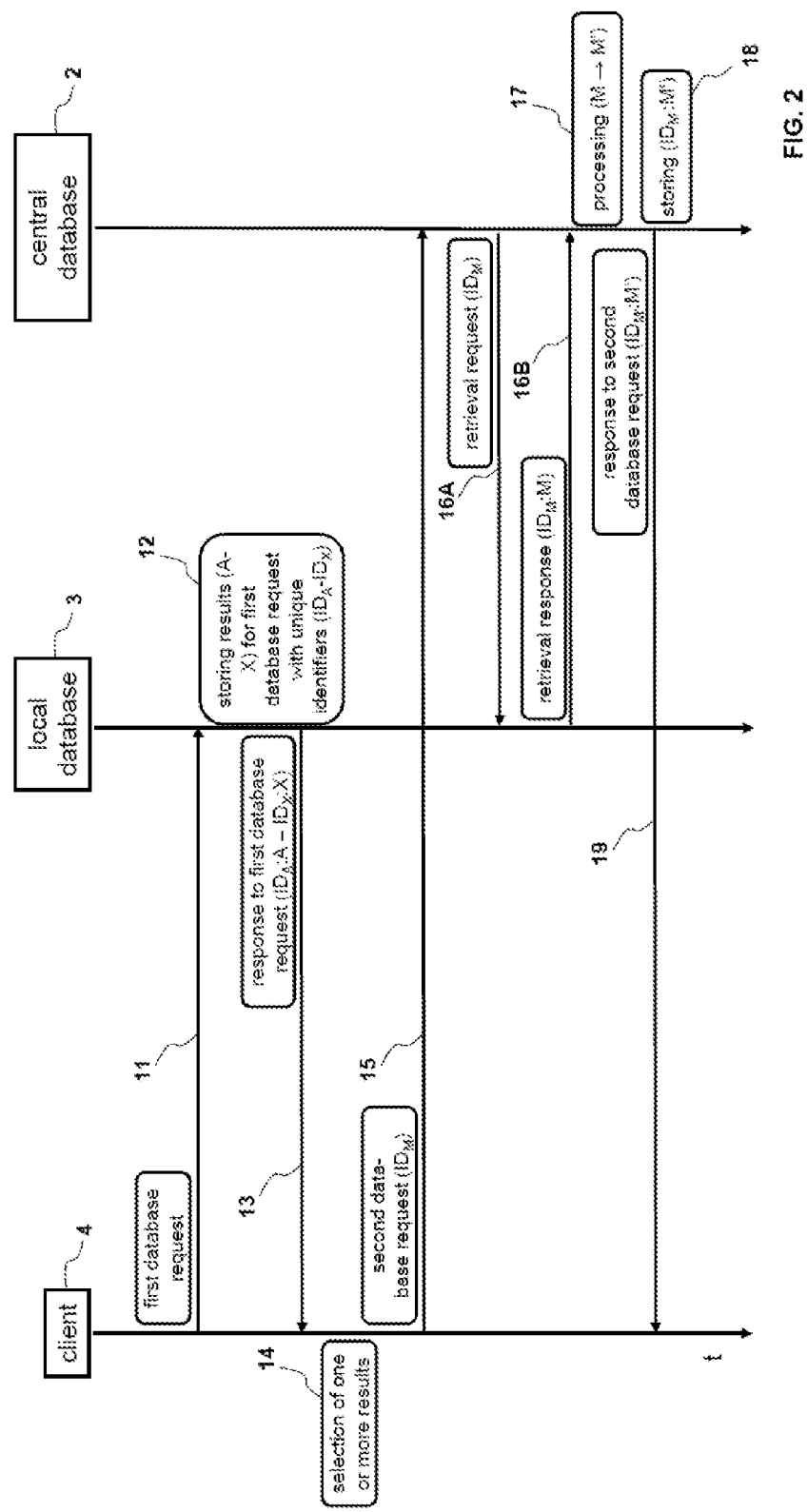
FIG. 2 illustrates an example of a basic database request processing sequence.

Utilizing the distributed database system 1, database requests are processed in a manner exemplarily visualized by FIG. 2. A first database request 11 is received by a local database subsystem 3 from a client device 4 and is processed by the local database subsystem 3. The local database subsystem 3 of FIG. 2 is one of the multiple local database subsystems 3 of the database system 1, e.g. the local database subsystem 3 which is geographically closest to the client device 4. Processing may, for example, include retrieving data identified by the first database request 11 from a database. Identification of data to be retrieved may include one or more search criteria or parameters in the first database request 11. The search criteria may include a search string, search text or search phrase. For example, the first database request 11 may be or comprise a SQL SELECT statement. In the example of FIG. 2, the client device 4 requests a set of multiple data records, exemplarily referred to as A to X.

The local database system 3, after having retrieved the data records, forming database results, associates the data records with unique identifiers, in the example of FIG. 2 denoted as IDA to IDx, and stores 12 the data records associated with the unique identifiers as the database results for the first database request. In this sense, the first database request 11 is a store operation as the first database requests effects storing the retrieved database results together with the unique identifiers. The database results may be stored by the local database system 3 temporarily, i.e. for a given expiration time period, for example 30 minutes, and e.g. in a local storage such as a cache (cf. FIG. 8) which allows a faster retrieval than retrieving the data records. The local database system 3 then returns the requested database results, i.e. the requested data records identified by the unique identifier, in a response 13 to the requesting client device 4.

The client device 4, after having received the response 13, then selects one or more of the received database results for further processing and generates a second database request 15. The second database request 15 includes one or more of the unique identifiers identifying the one or more database results selected for further processing. In the example of FIG. 2, the data record M identified by the unique identifier $ID_M$ has been selected. In accordance with the methodologies described herein, the second database request 15 is sent to the central database subsystem 2.

The central database subsystem 2 receives the second database request 15 indicating at least one unique identifier of at least one database result of a plurality of database results. As explained above, the plurality of database results (in the example of FIG. 2, data records A to X) have been stored with corresponding unique identifiers ($ID_A$ to $ID_X$) by the local database subsystem 3 in response to the first database request 11 received at the first local database subsystem 3.

Figure 3:
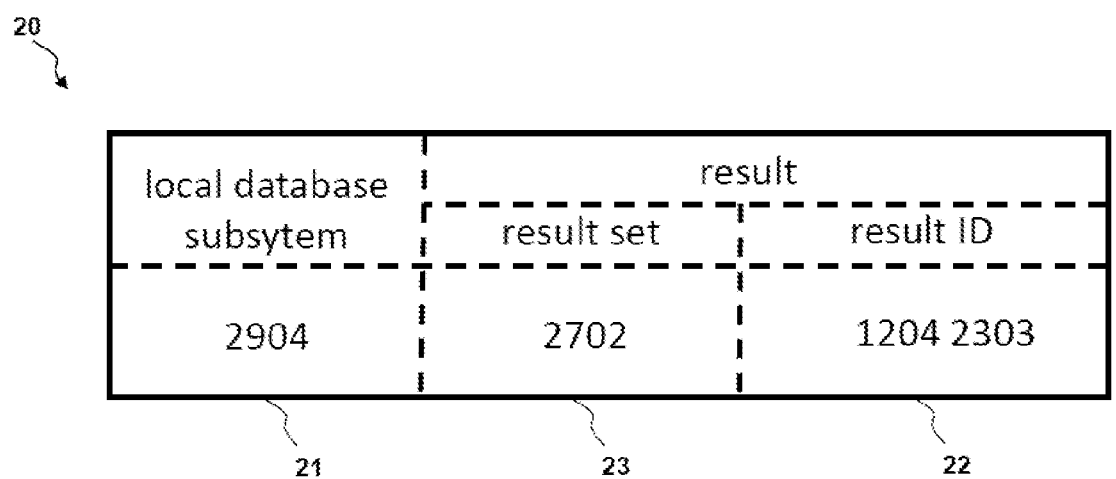
FIG. 3 shows an exemplary identifier structure.

In response to receiving the second database request 15, the central database subsystem 2 retrieves 16 the at least one database result identified by the at least one unique identifier from the first local database subsystem 3 which has served the first database request 11 and has stored 12 the database results. Retrieval 16 includes a retrieval request 16A from the central database subsystem 2 to the local database subsystem 3 via the communication interface 5. The retrieval request 16A includes the at least one unique identifier (in the example of FIG. 2: IDM). The local database subsystem 3 receives the retrieval request 16A and retrieves the at least one requested database result of the stored plurality of database results from the storage. The local database subsystem 3 then responds to the retrieval request 16A with a retrieval response 16B which includes the at least one requested database result, in the example of FIG. 3 the data record M, again identified by the unique identifier IDM. The central database subsystem 2 receives the retrieval response 16B.

In response to having retrieved the at least one requested database result from the local database subsystem 3, the central database subsystem 2 processes 17 the at least one retrieved database result. Processing may include any sort of data processing, reworking or reforming, supplementing etc. of the retrieved database results, depending on the specific use-case. FIG. 2 visualizes the processing 17 by a transformation of data record M to processed data record M'. The central database subsystem 2 then stores 18 the at least one processed database result persistently in a database of the central database subsystem. The term persistently refers here to a storage without the given expiration time employed by the local database subsystem 3 as mentioned above. However, this does not imply that the processed database results will never be deleted; deletion may occur e.g. in response to a deletion request or after an expiration time that is magnitudes longer than the expiration time employed by the local database subsystem 3. Again, the processed database results may be stored in association with corresponding unique identifiers ($ID_{M'}$:M') which may correspond to the previous unique identifiers (ID') or be newly generated unique identifiers. The processed database results are thus kept available for any subsequent further processing e.g. in response to further database requests.

The central database subsystem 2 also returns the processed at least one database result to the client device 4 by way of a response 19. The client device may then further handle the received processed database results, e.g. by displaying the processed database result on a device screen and/or re-integrating the processed database results in a client-side application such as a simulation evaluation, as briefly explained above.

The sequence of FIG. 2 has various technical advantages over a standard prior art system which e.g. utilizes a central data repository for sharing database results between subsystems of a distributed database system. Storing 12 the database results for the first database request 11 locally and temporarily with the local database subsystem 3 and retrieving 16 the selected database results from the local database subsystem 3 only in response to the second database request 15 relieves the communication interfaces 5 between the local database subsystems 3 and the central database subsystem 2 in a twofold manner. On the one hand, it is only the selected database results (i.e. generally only a subset of the overall stored database results for the first database request) which are transmitted from the local database subsystem 3 to the central database subsystem 2, i.e. less data is transmitted compared to transmitting the database results stored in response to the first database request 11 (in the example of FIG. 2: data record M is transmitted by retrieval 16, not all stored data records A to X). This is particularly beneficial e.g. in a setup in which the local database subsystems 3 are connected to the central database subsystem 2 by an expensive network connection (expensive in terms of transmission time, available bandwidth, etc.), such as the central database subsystem 2 being a computation center located in the US, while the local database subsystems 3 are computation centers in other continents. Here, the methodologies described herein save valuable cross-continent technical transmission resources. On the other hand, transmitting the selected database results only at the time of the second database request 15 results in a situation that nothing is transmitted from the local database subsystem 3 to the central database subsystem 2 in the event that a second database request 15 does not occur.

This is complemented by the option the database results may be stored only temporarily by the local database subsystem 3. As visualized by FIG. 5 and discussed further below, the database results may be deleted 33 by the local database subsystem 3 after a given expiration time $t_{exp}$. If a second database request 15 does not arrive at the central database subsystem 2 in a given and/or configurable time period following the first database request 11, the stored database results will be purged by the local database system 3, assuming that a second database request 15 will not arrive anymore. Hence, data transmission and data storage is more efficient in the distributed database system 1 taught herein compared with systems as mentioned above. Assuming that client devices select about 10% of the database results retrieved by way of the first database request 11 in selection 14, and that the second database request 15 is sent in 70% of the cases, the present database system 1 enables a decrease of network traffic to only 7% of network traffic in conventional systems as mentioned above, while achieving the same result of further processing at the central database subsystem 2.

In some embodiments, the unique identifiers employed by the database system 1 comprise a first portion identifying a local database subsystem 3 of the plurality of local database subsystems 3 storing the respective database result and a second portion identifying the respective database result. A non-limiting example of a structure of a unique identifier 20 is given by FIG. 3, according to which the unique identifier 20 includes first portion 21 that identifies the local database subsystem 3 which stores the plurality of database results retrieved for the first database request 11. The exemplary unique identifier 20 of FIG. 3 has an exemplary value of the first portion of 2904. Moreover, the unique identifier 20 has a second portion 22 which identifies an individual database result stored at the local database subsystem 3 identified by the value of the first portion 21. The exemplary unique identifier 20 of FIG. 3 has an exemplary value of the second portion of 1204 2303. It is understood that the specific format, length, etc. of the first and second portion is subject of the implementation of the database system 1 and depends, for example, on the number of local database subsystems 3 and the number of database results stored at a time by a local database subsystem 3.

Figure 4:
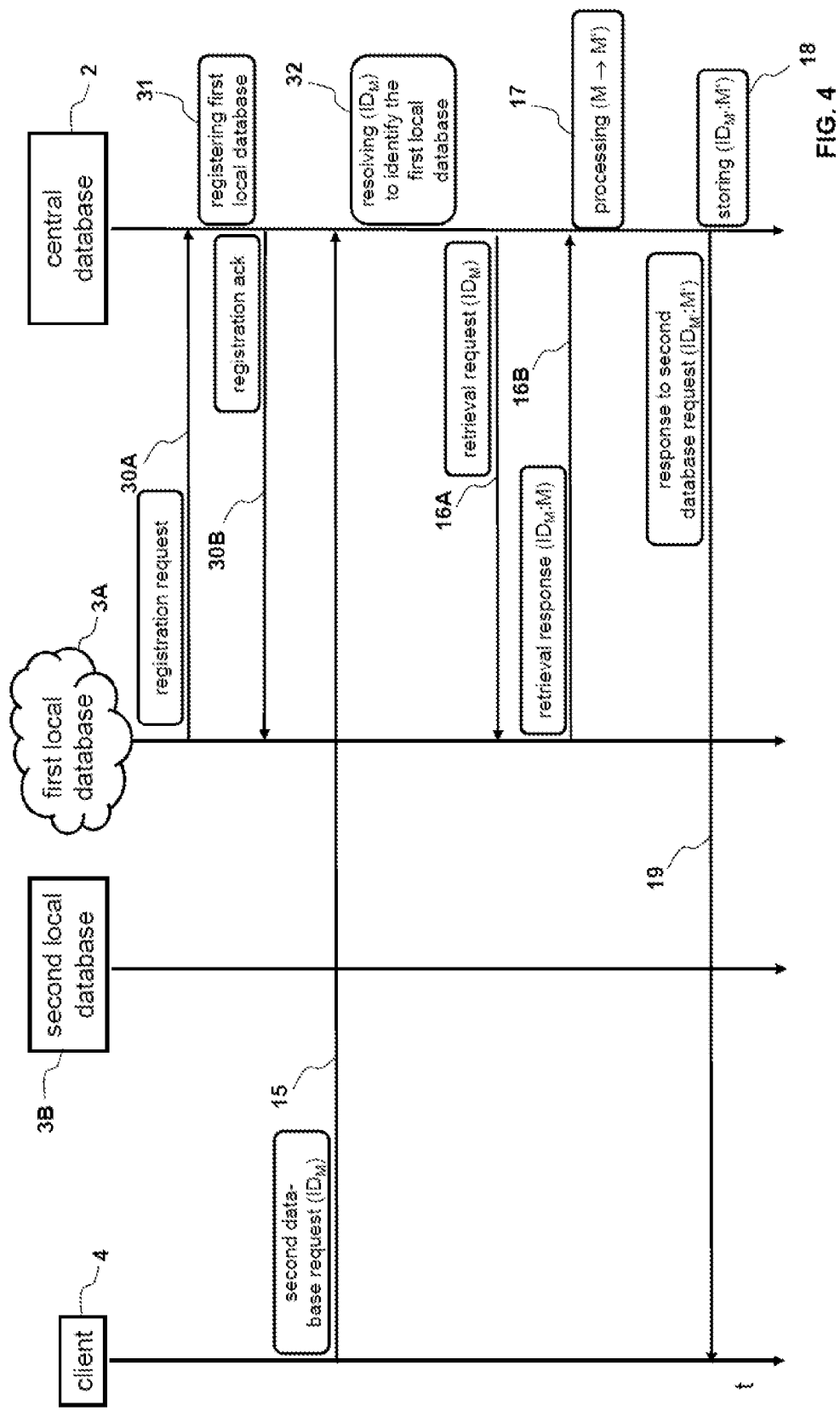
FIG. 4 relates to a registration procedure enabling the central database to identify a local database subsystem based on an identifier.

Now turning to an aspect of FIG. 4 (further aspects of FIG. 4 will be described further below), the first portion 21 and second portion 22 of the unique identifiers 20 may be utilized when retrieving the at least one database result by the central database subsystem 2 from the local database subsystem 3. Retrieving 16 may include resolving 32 the at least one unique identifier 20 included in the second database request 15 to identify, based on the first portion 21 of the at least one unique identifier 20, the first local database subsystem 3A as the local database subsystem 3A of the plurality of the local database subsystems 3 that stores the at least one database result. As again visualized by FIG. 4, the database system 1 comprises multiple local database subsystems 3 and the value of the first portion 21 indicates, in the example of FIG. 4, that the selected database result M is stored at the first local database subsystem 3A. Resolving 32 may include a look-up of a list or table which associates the individual local database subsystems 3 of the database system 1 with corresponding values of the first portion 21. By looking-up this list or table, taking the value of the first portion 21 of the unique identifier (ID') included in the second request 15 as a key, the central database system 2 identifies the first local database subsystem 3A as storing the selected database result (M) and is able to direct the retrieval request 16A to the correct local database subsystem 3A. For example, resolving 32 may obtain a Uniform Resource Locator (URL) or Uniform Resource Identifier (URI) of the local database subsystem 3 which, in turn, may be converted into an Internet Protocol (IP) address by way of a Domain Name System (DNS) query. Accordingly, the central database subsystem 2 sends the retrieval request 16A to the identified first local database subsystem 3A.

The retrieval request 16A then at least includes the second portion 22 of the at least one unique identifier ($ID_M$) in order to indicate to the first local database subsystem 3A which database result is to be retrieved. In turn, the first local database subsystem 3A utilizes the value of the second portion 22 to identify the correct stored database result and returns the database result identified by the second portion 22 to the central database subsystem 2 by way of the retrieval response 16B.

Referring back to FIG. 3, in some non-limiting embodiments, the at least one unique identifier 20 further comprises a third portion 23 identifying a set of database results which is constituted by the plurality of database results which have been stored by the first local database subsystem 3A. In such embodiments, the retrieval request 16A in FIG. 4 may also include the third portion 23 of the at least unique identifier 20 to retrieve the at least one database result identified by the at least one unique identifier from the set of database results. The third portion 23 may be understood as a logical part of the second portion 22, as the second portion 22 and the third portion 23 together constitute an identification of a database result which is unique at the level of a local database subsystem 3. The third portion enables the local database subsystems 3 to store the database results retrieved in response to the first database request 11 set-wise as opposed to storing the database results individually.

With continued reference to FIG. 4, in some embodiments, the database system 1 employs a registration of local database subsystems 3 with the central database subsystem 2. The registration builds up the table or list of pairs of first-portion values and local database subsystems 3. Registering a local database subsystem 3 with the central database subsystem 2 generally occurs before any second requests 15 are received by the central database subsystem 2 which relate to database results stored the local database subsystem 3. With respect to FIG. 4, registering the first local database subsystem 3A occurs at the central database subsystem 2 before receiving the second database request 15, enabling the central database subsystem 2 to properly process the second database request 15, in particular to locate the correct local database subsystem 3A.

In the example of FIG. 4, registering comprises a registration request 30A from the first local database subsystem 3A to the central database subsystem 2. In response to receiving the registration request 30A, the central database subsystem 2 generates a value for a local database subsystem identifier and returns the generated value to the first local database subsystem 3A by way of a registration acknowledgement message 30B. The central database subsystem 2 registers 31 the first local database subsystem 3A by writing the received local database subsystem identifier value into the table or list. The local database subsystem identifier value is subsequently used by the first local database subsystem 3A as the first portion 21 of the unique identifiers 20, and thus sent to the central database subsystem 2 by any second database request 15 in order to indicate that database results to be retrieved are stored by the first local database subsystem 3A, as already explained above. Hence, the central database subsystem 2 assigns the local database subsystem identifier identifying the first local database subsystem 3A, wherein the local database subsystem identifier constitutes the first portion 21 of the unique identifiers 20 of the plurality of database results which have been stored by the first local database subsystem 3A. The central database subsystem 2 stores the assigned local database subsystem identifier for subsequently retrieving database results from the first local database subsystem 3A. The central database subsystem 2 also returns the local database subsystem identifier to the requesting first local database subsystem 3A by way of the registration acknowledgement message 30B. The first local database subsystem 3A then utilizes the local database subsystem identifier when assigning unique identifiers to database results and storing and returning database results.

The registration may also be effected in other ways, for example by providing a list of multiple local database subsystem identifiers to the central database subsystem 2, thereby depositing the table or list of local database subsystems 3 in the database system 1 assigned with the corresponding identifiers partly or completely, as opposed to registering the local database subsystems 3 individually by the registration transactions including the registration request 30A and the registration acknowledgement message 30B of FIG. 4.

Figure 5:
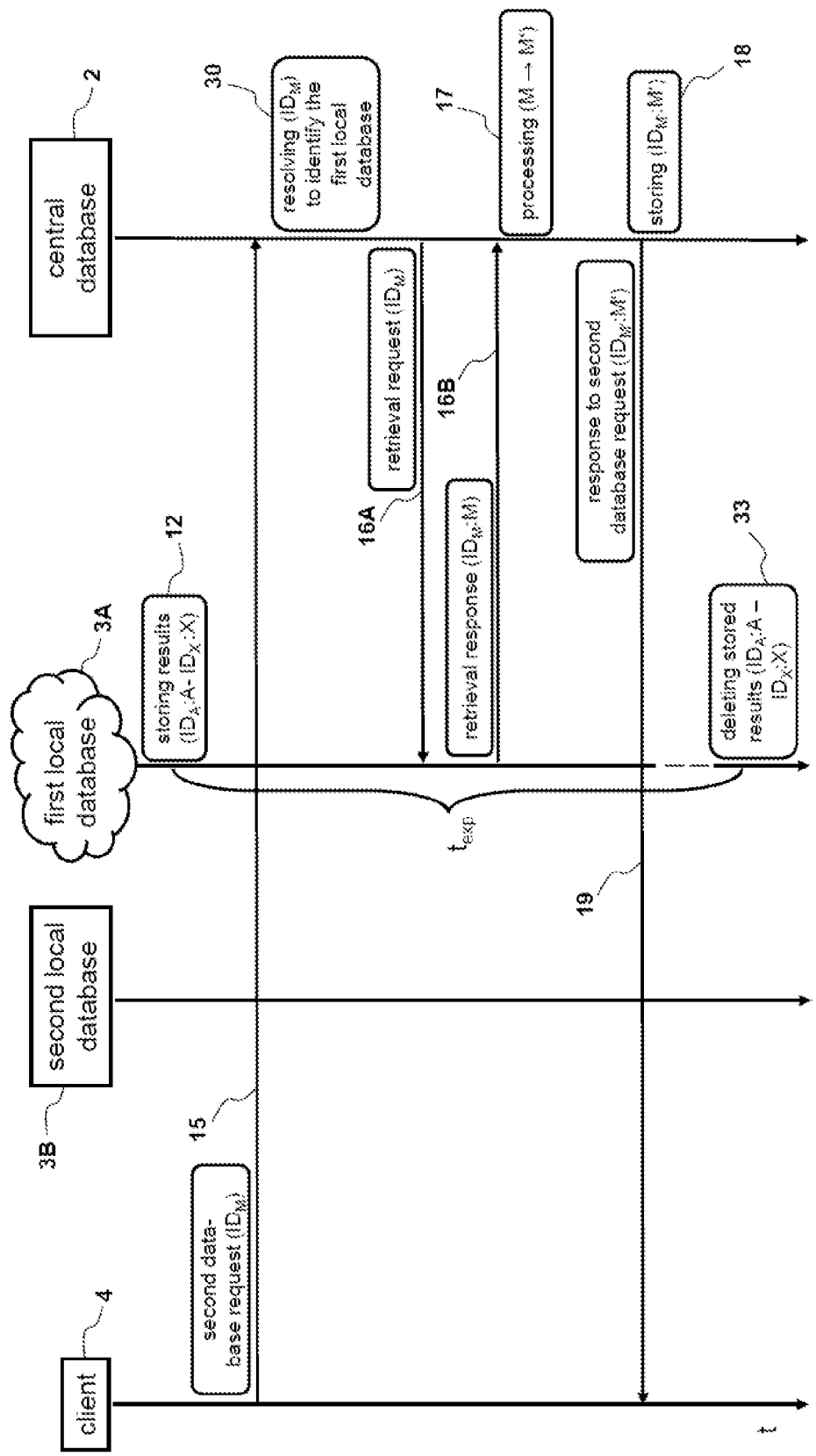
FIG. 5 is a flow diagram including deleting locally stored database results.

In some non-limiting embodiments, now with reference to FIG. 5, a local database subsystem 3 optionally deletes 33 the plurality of database results which have been stored by the first local database subsystem 3A during processing a first database request 11 upon expiry of a given time period after the storing 12. FIG. 5 exemplarily shows a deletion of the stored database results A to M after a given expiration time $t_{exp}$. This implements the temporary storage of the database results in the course of processing a first database request 11 as mentioned above. Deletion 33 may take place at the local database subsystem 3 irrespective of whether or not a second database request 15 occurs within the given time period. The duration of the given time period may be subject to the implementation of the database system 1 and may be set in the order to minutes or hours, e.g. to 30 minutes. The duration of the given time period may also be flexible in the way that the duration may depend e.g. on parameters of the first database request 11, e.g. on the client device 4 having sent the first database request 11, the number of stored database results, the amount of memory allocated by the stored database results, etc. Deletion 33 relieves the local database subsystems 3 from storing transitory data for a longer period of time and is, thus, one of the efficiency aspects of the database system 1.

Figure 6:
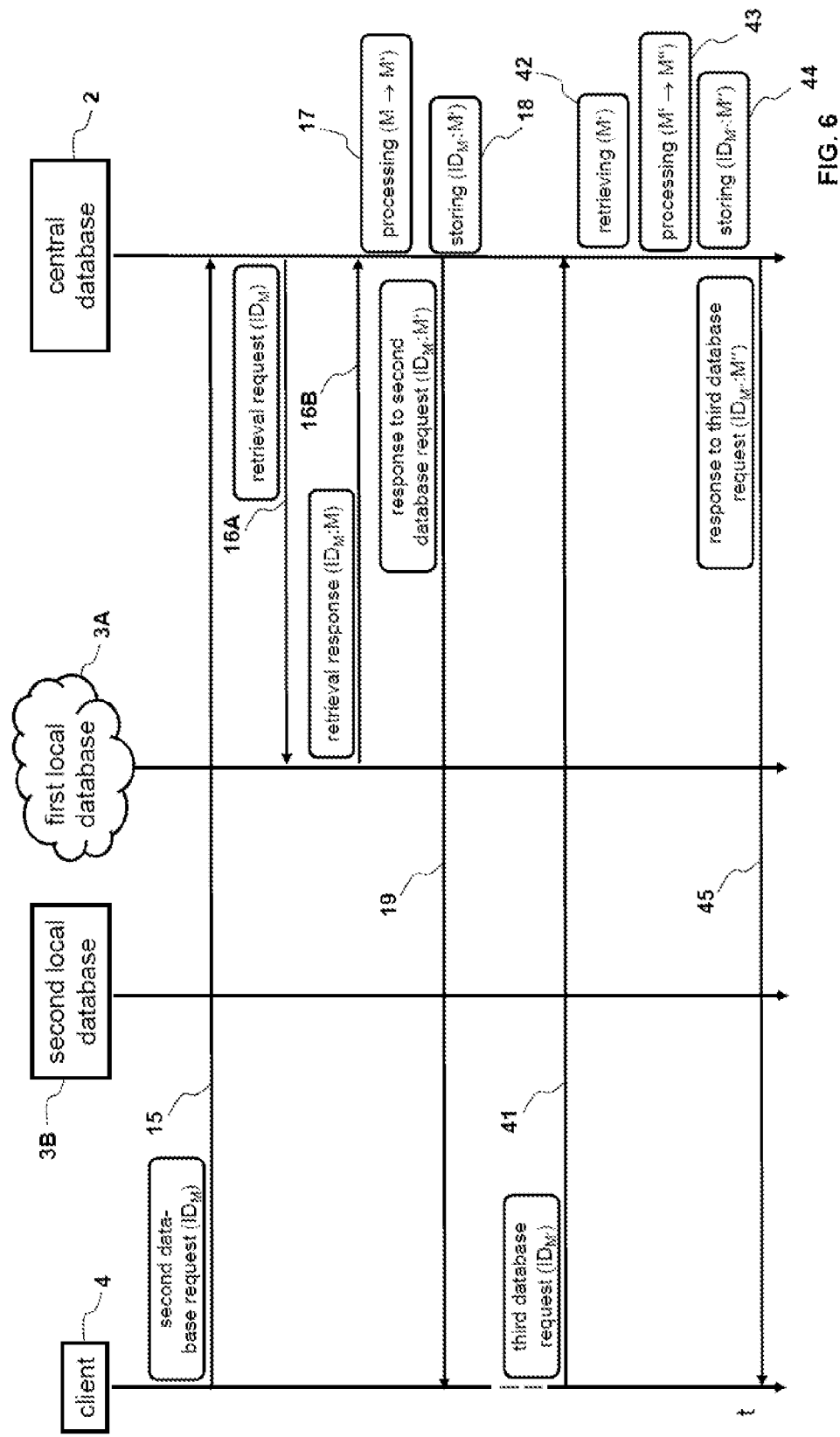
FIG. 6 illustrates a further example of a database request processing sequence.

In some non-limiting embodiments, now with reference to FIG. 6, the central database subsystem 2 also handles subsequent database requests which relate to processed database results (M') stored at the central database subsystem 2. In these embodiments, the central database subsystem 2 receives a third database request 41 indicating at least one of the unique identifiers (in the example of FIG. 6: $ID_{M'}$) of the at least one processed database result stored persistently in the database of the central database subsystem 2 (in the example of FIG. 6: data record M'). The central database subsystem 2 retrieves 42 the at least one database result (M') identified by the at least one unique identifier ($ID_{M'}$) indicated by the third database request 41 from the database of the central database subsystem 2. The central database subsystem 2 then further processes 43 the at least one retrieved database result and stores 44 the at least one further processed database result (in the example of FIG. 6 denoted as M") persistently in the database of the central database subsystem 2. The further processed database result is identified by the unique identifier (in the example of FIG. 6 denoted as $ID_{M''}$) in order to keep the further processed database result available for still further processing iterations. As mentioned above, depending on the use-case, the value of this unique identifier $ID_{M''}$ may be identical to the value of the unique identifier $ID_{M'}$ passed in the third database request 41 (e.g. if the at least one processed database result M' is updated to become M" in response to the third database request 41) or may have a new value (e.g. if the at least one further processed database result M" is stored in addition to the at least one processed database result M'). The central database subsystem 2 then returns the further processed database result identified by the unique identifier ($ID_{M''}$:M") to the client device 4 which sent the third database request 41.

Further processing iterations referring to processed database results stored at the central database subsystem 2 may take place in a similar manner as visualized by the example of FIG. 6.

In some embodiments, as visualized by FIGS. 4, 5 and 6, one or more of the local database subsystems 3 may form a cloud subsystem. In some embodiments, at least a part of the local database subsystems 3 forms a cloud computing environment, wherein the first database subsystem 3A e.g. serves as an edge server for the client device 4 of FIGS. 4, 5 and 6 sending the first database request 11, the edge server being geographically close to the location of the client device 4. Hence, local database subsystems 3 may not only host the functionality of processing first database requests and serving retrieval requests 16A, but offer application and infrastructure services to the client devices 4.

Figure 7:
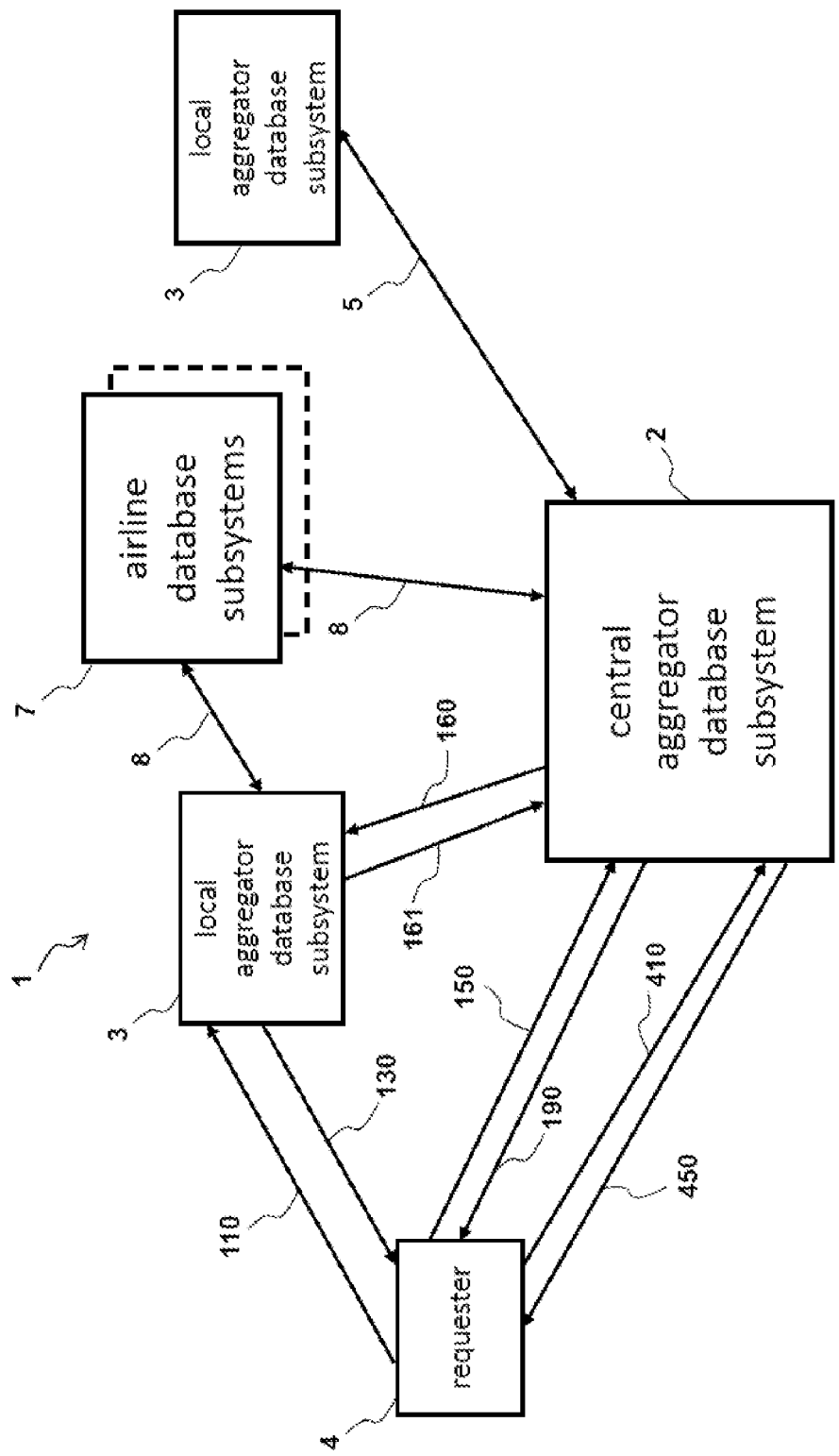
FIG. 7 visualizes a use-case embodiment in a distributed database system operating according to the New Distribution Capability (NDC) standard.

An exemplary database system employing the database technologies described herein in a database operating according to the New Distribution Capability (NDC) standard by the International Air Transport Association (IATA) is shown by FIG. 7. Here, at least one of the local database subsystem 3 (e.g. the first local database subsystem 3A described above) and the central database subsystem 2 operate according to the NDC standard. For example, the local database subsystems 3 and the central database subsystem 2 assume the role of the aggregator, and are thus denoted as local aggregator database subsystems 3 and central aggregator database subsystem 2 in the example of FIG. 7. The client 4 assumes the role of the requester of content distributed by the aggregator. In addition, the distributed database system 1 of the example of FIG. 7 may include at least one airline database subsystem 7 which assumes the role of a content provider providing flight offer data. The at least one airline database subsystem 7 is communicatively coupled 8, e.g. via one or more communication networks, with the at least one local aggregator database subsystem 3 as well as with the central aggregator database subsystem 2.

In the example of FIG. 7, the first database request 11 is a request to retrieve travel offers NDC (shopping request 110 based on the NDC standard) which is received by one of the local aggregator database subsystems 3 and answered by an NDC shopping response 130. In response to receiving the NDC shopping request 110, the local aggregator database subsystem 3 creates and stores an offer set with one or more offers as prescribed by the NDC standard. The offer set corresponds to the database results described above and is identified with a unique identifier, such as SFO-1234567890123456789 (corresponding to the third portion 23 as described above). Each offer in the offer set is identified by an index within the set (corresponding to the second portion 22 as described above). In addition, as explained above, the unique identifier may also include a first portion indicating the particular local aggregator database subsystem 3 which handles the NDC shopping request 110. An NDC shopping response 130 is sent back from the local aggregator database subsystem 3 to the requester 4, containing the unique identifier of the offer set and the indexes of the offers in the offer set.

Subsequently, the second database request 15 is received by the central aggregator database subsystem 2 which is, in the example of FIG. 7, an NDC pricing request (request to get price details of a selected travel offer based on the NDC standard) (denoted as 150 in FIG. 7). The NDC pricing request 150 indicates a specific offer identified by the unique identifier returned with the NDC shopping response 130, e.g. offer ID SFO-12345678901234567890-7. The central aggregator database system 2 retrieves the identified offer from the offer set stored at the local aggregator database subsystem 3, by way of the second and third portion of the unique identifier, i.e. the offer set identifier and the index of the offer. The retrieved offer is then processed 17, e.g. enriched with a price for the offer e.g. by retrieving current pricing information from the airline database subsystem 7. The processed offer is then stored 18 as standalone data record by the central aggregator database subsystem 2 with the unique identifier, i.e. the offer set identifier and the index SFO-12345678901234567890-7, and returned to the requester 4 by way of an NDC pricing response 190. The second database request may also be a request to purchase (e.g. to book or to order) a selected offer.

Moreover, as explained above, the central database subsystem 2 may also receive a third database request 41 at a later point of time. In the example of FIG. 7, the third database request 41 may be a request to purchase (e.g. to book or to order) a selected offer or a request to change or cancel an existing travel order based on the NDC standard (all denoted as 410 in FIG. 7). The central aggregator database subsystem 2 handles the NDC request to purchase the selected offer by retrieving 42 and further processing 43 the priced offer and storing 44 the further processed offer similarly to what has been described above with reference to FIG. 6, and returns a response 450 based on the NDC standard to the requester 4. If the third request 41 is a request to change or cancel a travel order, the central aggregator database subsystem 2 handles the NDC request by retrieving 42 and further processing 43 the existing order and storing 44 the further processed order similarly to what has been described above with reference to FIG. 6, and returns a response 450 based on the NDC standard to the requester 4.

In some embodiments, the first database request, the second database request, and the third database request as well as the corresponding responses may be based on an Application Programming Interface (API). The API may be provider-specific, particularly specific to facilitate communication with a content-offering provider. The API may provide a functionality to communicate with the provider. For example, the API may support a communication protocol to request offers from the provider. In a non-limiting example, the API may have been developed by the provider (e.g., a provider providing travel-related content such as airline content) and have been deployed to search, shop, price, book, re-accommodate etc. the travel-related content to others such as service providers (e.g., airlines). Using the API, the travel-related content may be fed into a back-end system of e.g. a service provider to enable implementation of direct channels for shopping such as airline website, mobile applications, call centers, or the like. More specifically, the API may provide functionality to connect a front-end to e.g. a system of a service provider (e.g., an airline system) hosted by the provider of the API in order to realize retailing.

Figure 8:
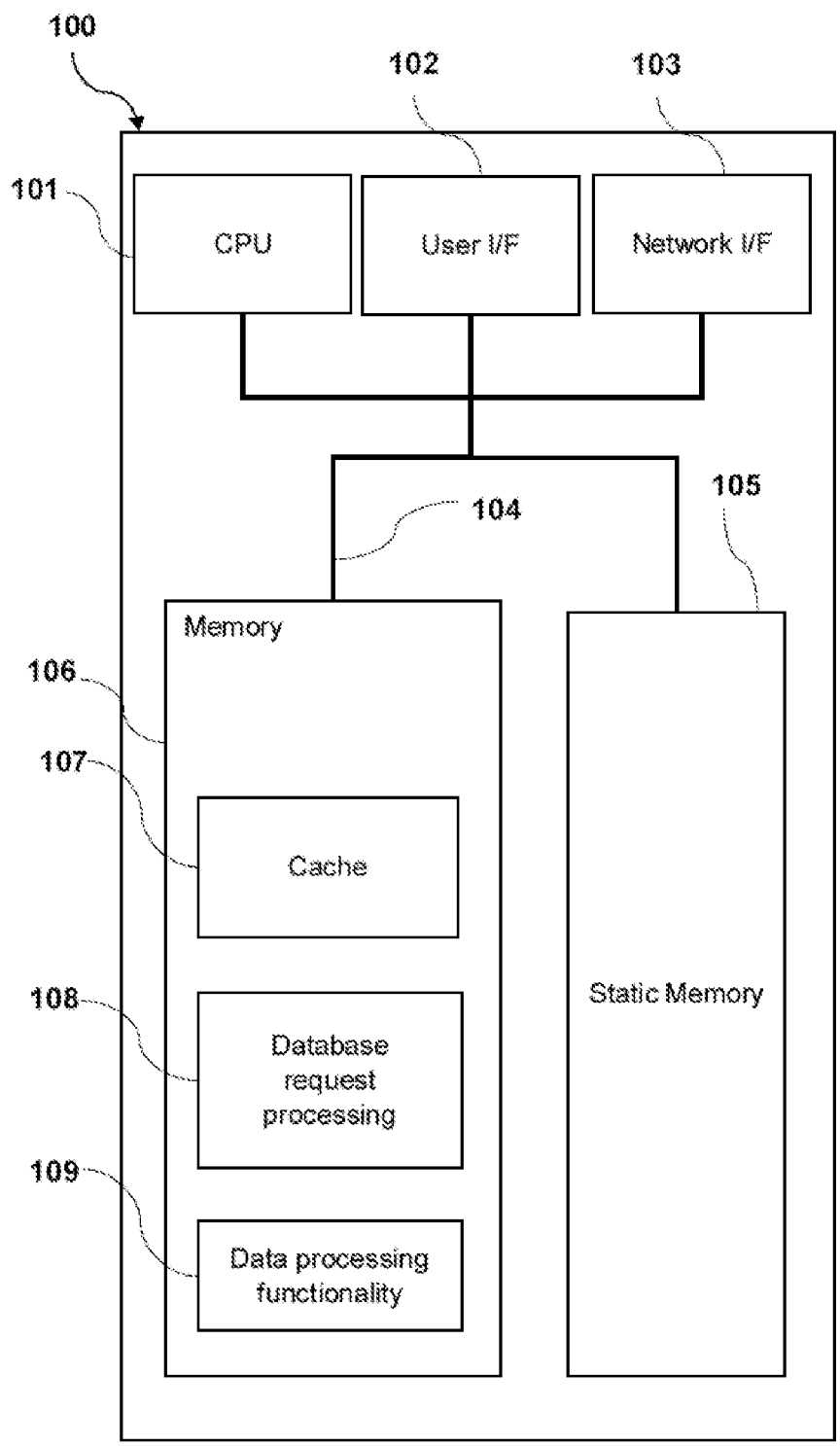
FIG. 8 shows an exemplary internal structure of a computing machine implementing a central database subsystem, a local database subsystem, or a client device.

Finally, FIG. 8 is a diagrammatic representation of a computer system 100 which provides the functionality of the central database subsystem 2, a local database subsystem 3 or a client device 4. Within the computer system 100 a set of instructions, to cause the computer system 100 to perform any of the methodologies discussed herein, may be executed.

For example, the computer system 100 includes at least one processor 101, a main memory 106 which also may include a caching memory 107, and a network interface device 103, which communicate with each other via a bus 104. Optionally, the computer system 100 may further include a static memory 105 which may also include a removable or non-removable disk-drive unit. A video display, an alpha-numeric input device and a cursor control device may be provided as examples of a user interface 102. The network interface device 103 connects the computer system 100 to the client devices 4 as well as to other entities of the database system 1, the Internet and/or any other network. A set of computer-executable instructions (i.e., computer program code) embodying any one, or all, of the methodologies described above, resides completely, or at least partially, in or on a machine-readable medium, e.g., the main memory 106 and/or the at least one processor 101. In particular, the code implements processing functionality 108 to process database requests 11, 15 and/or 41, and/or data processing functionality 109 to retrieve and store database results. A machine-readable medium on which the code resides may also be a non-volatile data carrier (e.g., a non-removable magnetic hard disk or an optical or magnetic removable disk) which is part of disk drive unit. The code may further be transmitted or received as a propagated signal via the Internet through the network interface device 103. In the memory 106 and/or cache 107, one or more databases may be stored and included in order to store the database results or processed database results or further database results. Basic operation of the computer system 100 including the user interface and network communication is controlled by an operating system.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include random access memory (RAM), read-only memory (ROM), erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used, such terms are intended to be inclusive in a manner similar to the term "comprising".

While all of the invention has been illustrated by a description of various examples and while these examples have been described in considerable detail, it is not the intention to restrict or in any way limit the scope to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

The invention claimed is:

1. A method for processing database requests in a distributed database system comprising a central database subsystem in communication with a plurality of local database subsystems distributed geographically, the plurality of local database subsystems comprising a first local database subsystem, the central database subsystem configured to process database results generated by the plurality of local database subsystems, the method comprising, at the central database subsystem:
    receiving, at the central database subsystem, from a client device, a second database request indicating at least one unique identifier of at least one database result of a plurality of database results which have been stored with corresponding unique identifiers by the first local database subsystem in response to a first database request received at the first local database subsystem from the client device;
    retrieving, at the central database subsystem, the at least one database result identified by the at least one unique identifier from the first local database subsystem;
    processing, at the central database subsystem, the at least one retrieved database result to produce at least one processed database result, the processing of the at least one retrieved database result comprising one or more of reworking, reforming and supplementing the at least one retrieved database result to produce the at least one processed database result including enriched information, the one or more of the reworking, the reforming and the supplementing occurring by the central database subsystem communicating with a further database subsystem that comprises a content provider providing content associated with the at least one retrieved database result;
    storing, by the central database subsystem, the at least one processed database result persistently in a database of the central database subsystem; and
    returning, by the central database subsystem, the at least one processed database result to the client device, as a response to the second database request.

2. The method of claim 1, wherein a unique identifier of the unique identifiers comprises a first portion identifying a local database subsystem of the plurality of local database subsystems storing the respective database result and a second portion identifying the respective database result, and wherein retrieving the at least one database result comprises:
    resolving the at least one unique identifier included in the second database request to identify, based on the first portion of the at least one unique identifier, the first local database subsystem as the local database subsystem of the plurality of the local database subsystem that stores the at least one database result, and
    sending a retrieval request including at least the second portion of the at least one unique identifier to the identified first local database subsystem.

3. The method of claim 1, wherein the at least one unique identifier further comprises a third portion identifying a set of database results which is constituted by the plurality of database results which have been stored by the first local database subsystem, wherein the retrieval request includes the third portion of the at least unique identifier to retrieve the at least one database result identified by the at least one unique identifier from the set of database results.

4. The method of claim 2, further comprising:
    before receiving the second database request, registering, at the central database subsystem, the first local database subsystem, comprising:
    assigning a local database subsystem identifier identifying the first local database subsystem, wherein the local database subsystem identifier constitutes the first portion of the unique identifiers of the plurality of database results which have been stored by the first local database subsystem; and
    storing the assigned local database subsystem identifier for retrieving database results from the first local database subsystem.

5. The method of claim 1, further comprising:
    deleting, by the first local database subsystem, the plurality of database results which have been stored by the first local database subsystem upon expiry of a given time period after the storing.

6. The method of claim 1, further comprising, at the central database subsystem:
    receiving, at the central database subsystem, from the client device, a third database request indicating at least one of the unique identifiers of the at least one processed database result stored persistently in the database of the central database subsystem;
    retrieving the at least one database result identified by the at least one unique identifier indicated by the third database request from the database of the central database subsystem;
    further processing the at least one retrieved database result to produce at least one further processed database result;
    storing the at least one further processed database result persistently in the database of the central database subsystem; and
    returning, by the central database subsystem, the at least one further processed database result to the client device, as a response to the third database request.

7. The method of claim 1, wherein the first local database subsystem is a cloud subsystem.

8. The method of claim to 6, wherein at least the first local database subsystem and the central database subsystem operate according to the New Distribution Capability (NDC) standard.

9. The method of claim 8, wherein the first database request is a request to retrieve travel offers and the second database request is a request to get pricing information on a selected travel offer or a request to purchase a selected travel offer.

10. The method of claim 9, wherein the third database request is a request purchase a selected travel offer or a request to change or cancel a travel order.

11. A central database subsystem for processing database requests, the central database subsystem being part of a distributed database system also comprising a plurality of local database subsystems distributed geographically, the central database subsystem in communication with the plurality of local database subsystems comprising a first local database subsystem, the central database subsystem configured to process database results generated by the plurality of local database subsystems, the central database subsystem comprising a processor and a memory including instructions that, when executed by the processor, cause the central database subsystem to:
  receive, from a client device, a second database request indicating at least one unique identifier of at least one database result of a plurality of database results which have been stored with corresponding unique identifiers by the first local database subsystem in response to a first database request received at the first local database subsystem from the client device;
  retrieve the at least one database result identified by the at least one unique identifier from the first local database subsystem;
  process the at least one retrieved database result to produce at least one processed database result, processing of the at least one retrieved database result comprising one or more of reworking, reforming and supplementing the at least one retrieved database result to produce the at least one processed database result including enriched information, the one or more of the reworking, the reforming and the supplementing occurring by the central database subsystem communicating with a further database subsystem that comprises a content provider providing content associated with the at least one retrieved database result;
  store the at least one processed database result persistently in a database of the central database subsystem; and
  return the at least one processed database result to the client device, as a response to the second database request.

12. The central database subsystem of claim 11, wherein a unique identifier of the unique identifiers comprises a first portion identifying a local database subsystem of the plurality of local database subsystems storing the respective database result and a second portion identifying the respective database result, and wherein retrieving the at least one database result comprises:
  resolving the at least one unique identifier included in the second database request to identify, based on the first portion of the at least one unique identifier, the first local database subsystem as the local database subsystem of the plurality of the local database subsystem that stores the at least one database result, and
  sending a retrieval request including at least the second portion of the at least one unique identifier to the identified first local database subsystem.

13. The central database subsystem of claim 11, wherein the at least one unique identifier further comprises a third portion identifying a set of database results which is constituted by the plurality of database results which have been stored by the first local database subsystem, wherein the retrieval request includes the third portion of the at least unique identifier to retrieve the at least one database result identified by the at least one unique identifier from the set of database results.

14. The central database subsystem of claim 11, wherein the instructions are further configured to cause the central database subsystem to:
  before receiving the second database request, register, the first local database subsystem, comprising:
  assigning a local database subsystem identifier identifying the first local database subsystem, wherein the local database subsystem identifier constitutes the first portion of the unique identifiers of the plurality of database results which have been stored by the first local database subsystem; and
  storing the assigned local database subsystem identifier for retrieving database results from the first local database subsystem.

15. The central database subsystem of claim 11 wherein the instructions are further configured to cause the central database subsystem to:
  receive, from the client device, a third database request indicating at least one of the unique identifiers of the at least one processed database result stored persistently in the database of the central database subsystem;
  retrieve the at least one database result identified by the at least one unique identifier indicated by the third database request from the database of the central database subsystem;
  further process the at least one retrieved database result to produce at least one further processed database result;
  store the at least one further processed database result persistently in the database of the central database subsystem; and
  return the at least one further processed database result to the client device, as a response to the third database request.

16. The central database subsystem of claim 15, wherein the central database subsystem operates according to the New Distribution Capability (NDC) standard.

17. The central database subsystem of claim 16, wherein the first database request is a request to retrieve travel offers and the second database request is a request to get pricing information on a selected travel offer or a request to purchase a selected travel offer.

18. The central database subsystem of claim 16, wherein the third database request is a request to purchase a selected travel offer or a request to change or cancel a travel order.

19. A computer program product comprising program code instructions stored on a non-transitory computer readable medium to execute the method according to claim 1 when said program is executed on a computer.

* * * * *